United States Patent [19]
Kondo et al.

[11] Patent Number: 6,159,542
[45] Date of Patent: Dec. 12, 2000

[54] PROCESS FOR PRODUCING A MEMBRANE FOR SEPARATING A MIXTURE

[75] Inventors: Masakazu Kondo; Yoshio Morigami, both of Tamano; Kenichi Okamoto; Hidetoshi Kita, both of Ube, all of Japan

[73] Assignee: Mitsui Engineering & Shipbuilding Co., Ltd., Tokyo, Japan

[21] Appl. No.: 09/360,438

[22] Filed: Jul. 26, 1999

[51] Int. Cl.$^7$ ............................... B01J 20/28; B05D 5/00
[52] U.S. Cl. ...................... 427/245; 427/247; 427/397.7; 502/4
[58] Field of Search .................................... 427/244, 245, 427/246, 247, 397.7; 502/4

[56] References Cited

U.S. PATENT DOCUMENTS

| | | | |
|---|---|---|---|
| 2,950,952 | 8/1960 | Breck et al. ................................ | 23/113 |
| 3,758,539 | 9/1973 | Flank ................................... | 252/455 Z |
| 5,871,650 | 2/1999 | Lai et al. ................................. | 427/247 |

*Primary Examiner*—Shrive Beck
*Assistant Examiner*—Kirsten A. Crockford
*Attorney, Agent, or Firm*—Fay, Sharpe, Fagan, Minnich & McKee, LLP

[57] ABSTRACT

There is provided a process for producing an acid-resistant membrane for separating a mixture, which is used for separation of a liquid and/or gas mixture by pervaporation, vapor permeation etc. The process for producing a membrane for separating a mixture comprises a step of carrying seed crystals of T-type zeolite on a porous support; a step of stirring an aqueous mixture containing a silica source, an alumina source, sodium ions, and potassium ions as the starting materials and then aging the mixture for a predetermined time and a step of immersing the porous support carrying the seed crystals in the aged mixture and then subjecting it to hydrothermal reaction to deposit T-type zeolite on the porous support. There can be provided the separation membrane on which chemical resistance such as acid resistance and alkali resistance as well as durability besides the molecular sieve ability of zeolite itself have been conferred.

10 Claims, 5 Drawing Sheets

PROCESS FOR PRODUCING A MEMBRANE FOR SEPARATING A MIXTURE

BACKGROUND OF THE INVENTION

1. Field of the Invention

The present invention relates to a process for producing a membrane for separating a liquid and/or gas mixture and in particular to a process for producing a membrane for separating the mixture, which is used for separation of a liquid and/or gas mixture by pervaporation, vapor permeation etc.

2. Description of the Related Art

Organic materials represented by polymeric materials such as polydimethylsiloxane and polyimide are used in membranes for separating liquid or gas mixtures, but there remain problems with thermal resistance and durability as well as selectivity and permeation rate in separation.

In recent years, separation membranes using inorganic materials have been studied to solve these problems of organic materials, among which zeolite membranes particularly attract attention. Among these zeolite membranes developed so far, there are known an NaA-type zeolite membrane obtained by subjecting an aqueous mixture containing a silica source and an alkali metal source to hydrothermal synthesis in the presence of an alumina porous support (Japanese Patent No. 2,501,825) and an A-type zeolite membrane deposited on a porous support (Laid-open Japanese Patent Publication No. Hei 8- 318,141).

However, the NaA-type zeolite membrane, though being superior in mechanical strength, thermal resistance and water-selective permeability on pervaporation of a water/organic solvent system, is sensitive to acid, and when a trace acid is contained as an impurity in a mixture, the NaA-type zeolite membrane is deteriorated, so the pre-treatment of the mixture is required or the application of the membrane must be abandoned. Further, a separation membrane having the A-type zeolite membrane deposited possesses high water-selective permeability and is effective for separation of a water-ethanol mixture, but there is the problem of significant deterioration with acid.

The object of the present invention is to provide a membrane for separating a mixture, which can efficiently separate a liquid or gas mixture and is highly resistant to acid and alkali, thus solving the drawbacks of the conventional separation membranes described above.

SUMMARY OF THE INVENTION

The invention claimed in the present application is as follows:

1. A process for producing a membrane for separating a liquid and/or gas mixture, comprising the step of depositing seed crystals of T-type zeolite on a porous support; the step of stirring an aqueous mixture containing a silica source, an alumina source, sodium ions, and potassium ions as the starting materials and then aging the aqueous mixture for a predetermined time; and the step of immersing the porous support having the seed crystals in the aged mixture and then subjecting it to hydrothermal reaction to deposit T-type zeolite on the porous support.

2. A process for producing a membrane for separating the mixture according to item 1 above, wherein the constituent ratio (molar ratio) of the starting materials charged is regulated such that $SiO_2/Al_2O_3$=30 to 150, $OH^-/SiO_2$=0.1 to 1.0, $Na^+/(Na^++K^+)$=0.1 to 1.0, and $H_2O/(Na^++K^+)$=10 to 50.

3. A process for producing a membrane for separating the mixture according to item 1 or 2 above, wherein the hydrothermal reaction is conducted at a temperature of 80 to 150° C. at normal pressure for 1 to 168 hours.

4. A process for producing a membrane for separating the mixture according to any one of items 1 to 3 above, wherein the molar ratio of erionite/offretite in the T-type zeolite is 0.5 to 0.95/0.5 to 0.05.

DETAILED DESCRIPTION OF THE PREFERRED EMBODIMENT

Figure 1:
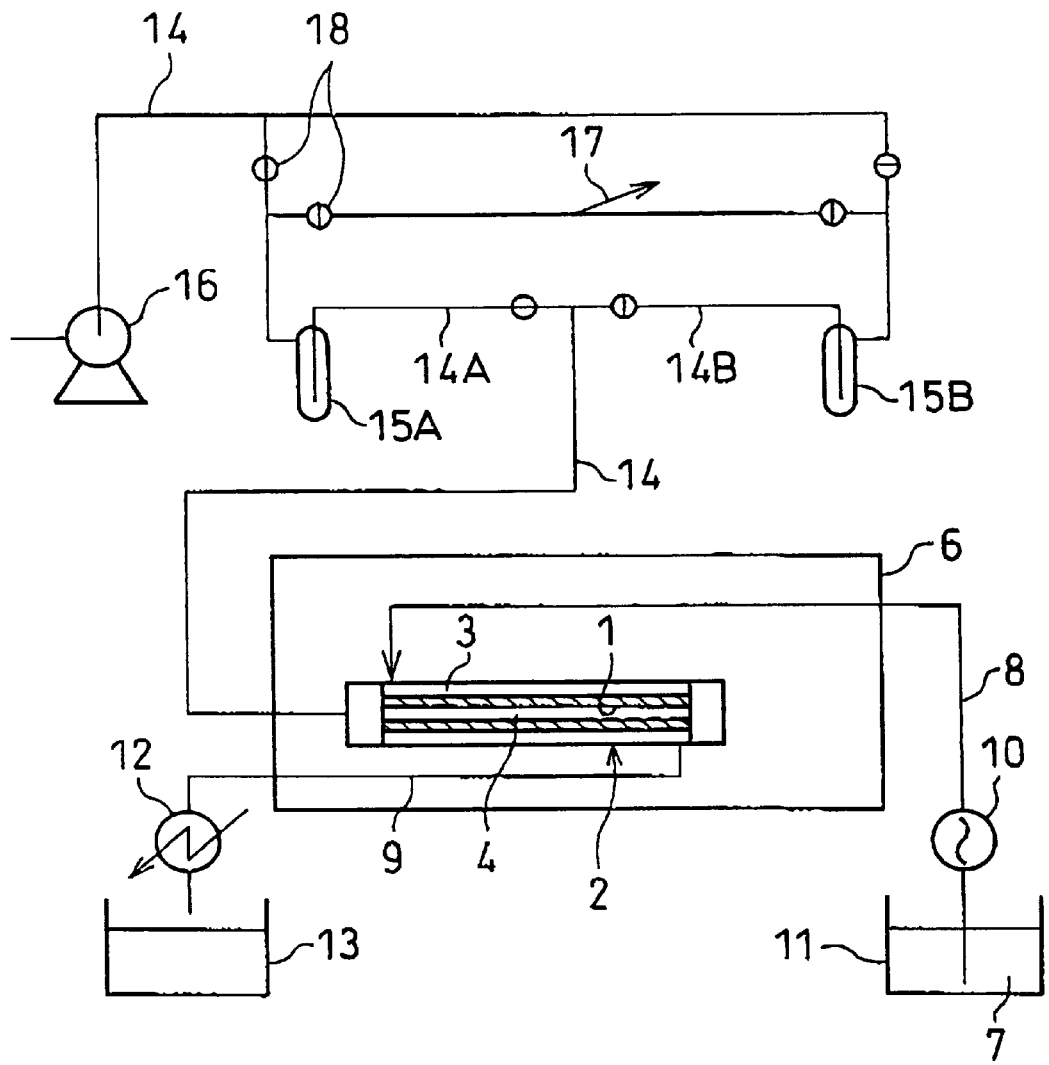
FIG. 1 is a diagram showing the constitution of an unit for measuring the separation performance of T-type zeolite membranes obtained in the Example of the present invention.

The porous support used in the present invention can be selected from porous materials consisting of ceramics such as alumina, silica, zirconia, silicon nitride and silicon carbide, metals such as aluminum, silver and stainless steel, and organic polymers such as polyethylene, polypropylene, polytetrafluoroethylene, polysulfone and polyimide. The porous supports are preferably those having an average pore diameter of 0.05 to 10 $\mu$m and a porosity of 10 to 60% or so. Among these, $Al_2O_3$—$SiO_2$-based ceramics having an average pore diameter of 0.1 to 2 $\mu$m, a porosity of 30 to 50% and an $Al_2O_3$ content of 50 to 100 wt-% are preferable.

As the support for the separation membrane used in pervaporation or vapor permeation, the porous support is preferably in the form of a pipe of about 10 mm in outer diameter. 20 to 100 cm in length and 0.2 to several mm in thickness, or a rhizome-like cylinder of about 30 to 100 mm in outer diameter and 20 to 100 cm or more in length having a large number of pores of about 2 to 12 mm in internal diameter formed therein in the axial direction.

To form the T-type zeolite membrane on the porous support, seed crystals of T-type zeolite are carried on the porous support and then the T-type zeolite membrane is deposited thereon. As the seed crystal in this case, T-type zeolite crystals with an average particle diameter of 500 $\mu$m or less, particularly 10 to 150 $\mu$m, are preferable. The amount of seed crystals on the porous support is preferably 1 to 500 mg/cm$^2$, more preferably 10 to 60 mg/cm$^2$.

To allow the support to carry the seed crystals, it is preferable that powder of the seed crystals is suspended in a solvent preferably water. Alternatively, this suspension is applied onto the porous supports. Alternatively, powder of the T-type zeolite may be mixed with the starting materials at the time of production of the porous support.

To form the T-type zeolite membrane on the support, a silica source such as colloidal silica (silica gel and sol), silica powder and sodium silicate, an alumina source such as sodium aluminate and aluminum hydroxide, and a cation source such as sodium hydroxide and potassium hydroxide are used as the starting materials, and distilled water is added at a predetermined ratio to these materials, and the mixture is stirred and subjected to aging for a predetermined time. Then, the support having the T-type zeolite seed crystals adhering thereto is immersed in the mixture thus aged and subjected to hydrothermal synthesis at a predetermined temperature for a predetermined time. Besides hydrothermal synthesis, a method such as a gaseous phase method can be mentioned in order to form the membrane on the support.

As the conditions for forming the T-type zeolite membrane by hydrothermal synthesis, the reaction is conducted once at a temperature of 60 to 150° C., preferably 80 to 100° C., for 1 to 48 hours, particularly 12 to 36 hours, more preferably 20 to 24 hours, whereby the membrane superior in separation characteristics can be formed.

When the porous support is $Al_2O_3$—$SiO_2$-based ceramics with an $Al_2O_3$ content of 50 to 100 wt-%, the reaction is conducted at 90 to 100° C. for 10 hours or more, preferably 20 to 24 hours, whereby the T-type zeolite membrane excellent in separation performance can be formed in one operation.

The constituent ratio (molar ratio, hereinafter the constituent ratio is expressed in terms of molar ratio) of the starting materials charged is regulated preferably such that for example, $SiO_2/Al_2O_3$=30 to 150, $OH^-/SiO_2$=0.1 to 1.0, $Na^+/(Na^++K^+)$=0.1 to 1.0, and $H_2O/(Na^++K^+)$=10 to 50.

Thus, the T-type zeolite membrane is formed until its thickness comes to attain 3 to 100 µm, preferably 10 to 50 µm, or the total thickness of the separation membrane including the support comes to attain 1 to 3 mm or so, whereby the suitable separation membrane of the present invention can be obtained.

The separation membrane of the present invention obtained in this manner can be used very effectively for separation of a liquid and/or gas mixture by pervaporation or vapor permeation.

The mixture as the subject of separation by the membrane obtained in the present invention includes a mixture containing 2 or more compounds including water, alcohols such as methanol, ethanol and propanol, organic liquids such as ketones such as acetone and methyl ethyl ketone, hydrocarbon halides such as carbon tetrachloride and trichloride, and/or gases such as $CO_2$ and $N_2$, and particularly, the membrane is used preferably when an acid is contained as an impurity as in the mixture.

The mixture having a superior separation selectivity by the membrane of the present invention includes e.g. water-organic liquid mixtures, particularly water-alcohol type hydrocarbon mixtures such as water-methanol and water-ethanol.

EXAMPLES

Hereinafter, the present invention is described in more detail by reference to the Examples, which however are not intended to limit the present invention.

Example 1

The constituent ratio of colloidal silica as the silica source, sodium aluminate as the alumina source, sodium hydroxide and potassium hydroxide as the cation source, and distilled water were adjusted such that $SiO_2/Al_2O_3$=30 to 150, $OH^-/SiO_2$=0.1 to 1.0, $Na^+/(Na^++K^+)$=0.1 to 1.0, and $H_2O/(Na^+ +K^+)$=10 to 50, and these were mixed and stirred, and the mixture was subjected to aging at room temperature in air for 28 to 48 hours. A porous alumina support (mullite from Nikkato Ltd.: diameter, 1.2 cm; length, 14 cm; wall thickness, 1.5 cm; pore diameter, 1 µm; porosity, 40%) having seed crystals of T-type zeolite applied thereto was immersed in the gel obtained above after aging, and then subjected to hydrothermal synthesis at a temperature of 80 to 150 °C. at normal pressure for 5 to 168 hours. After synthesis, the formed support was washed with distilled water and immersed in distilled water for 6 to 24 hours, and dried in a oven at 70° C. The peak pattern in an X-ray diffraction diagram of the resulting T-type zeolite membrane was found to agree well with that of mixed crystals of erionite and offretite (0.7:0.3) as characteristic T-type zeolite, indicating that T-type zeolite membrane was formed on the surface of the support. The thickness of the membrane produced in the process described above was found to be in the range of about 30 to 100 µm.

The pervaporation performance of the T-type zeolite membrane obtained in Example 1 above was measured. FIG. 1 is a schematic drawing of a measurement unit therefor. As described above, the T-type zeolite membrane formed on the tubular porous alumina support as described above is arranged concentrically in separation cell 2, and the effective area of the membrane is 47 cm². The separation cell 2 is divided by the T-type zeolite membrane 1 into a feed chamber 3 and a permeating vapor chamber 4, and is arranged in a thermostatic chamber 6. A feed pipe 8 for a feed liquid 7 is connected to one end of the feed liquid chamber 3, and a discharge pipe 9 is connected to the other end. The feed pipe 8 is provided via a pump 10 with a feed liquid storage tank 11, and the discharge pipe 9 is provided via a heat exchanger 12 with a discharge liquid retainer 13. A pipe 14 for removal of separated liquid is connected to the permeating vapor chamber 4, and this pipe further branches into pipes 14A and 14B which are connected respectively via cooling traps 15A and 15B to a vacuum pump 16. In the drawing, 17 is a changeover cock and 18 is a valve. The vapor phase is removed by the vacuum pump 16 from the separated liquid which has passed through the T-type zeolite membrane 1, and this vapor phase is cooled in the cooling trap 15A or 15B and solidified in liquid $N_2$ for recovery.

In the unit illustrated above, water/ethanol mixture as a liquid to be separated was fed at a flow rate of 12 to 30 cm³/min to the feed liquid chamber 3, and the temperature of the fed liquid was regulated at 75° C. by a thermostatic chamber 6. The degree of vacuum at the permeating side was kept at 0.1 Torr via a cold trap 15A or 15B by the vacuum pump 16. The permeated material was captured by solidification with liquid nitrogen in the cold trap. The composition of the material was measured by gas chromatography. The permeation performance of the membrane was evaluated by total permeation volume Q (kg/m²h) per unit area and time and by the separation coefficient α defined by the following formula:

$$\alpha=(P_A/P_B)/(F_A/F_B)$$

wherein $F_A$ and $F_B$ are respectively the average concentrations (wt %) of organic liquid A and water B in the fed liquid, and $P_A$ and $P_B$ are respectively the average concentrations (wt %) of the organic liquid A and water B in the permeated liquid.

Hereinafter, the membrane manufacturing conditions and evaluation results are described by reference to the figures and tables.

Figure 2:
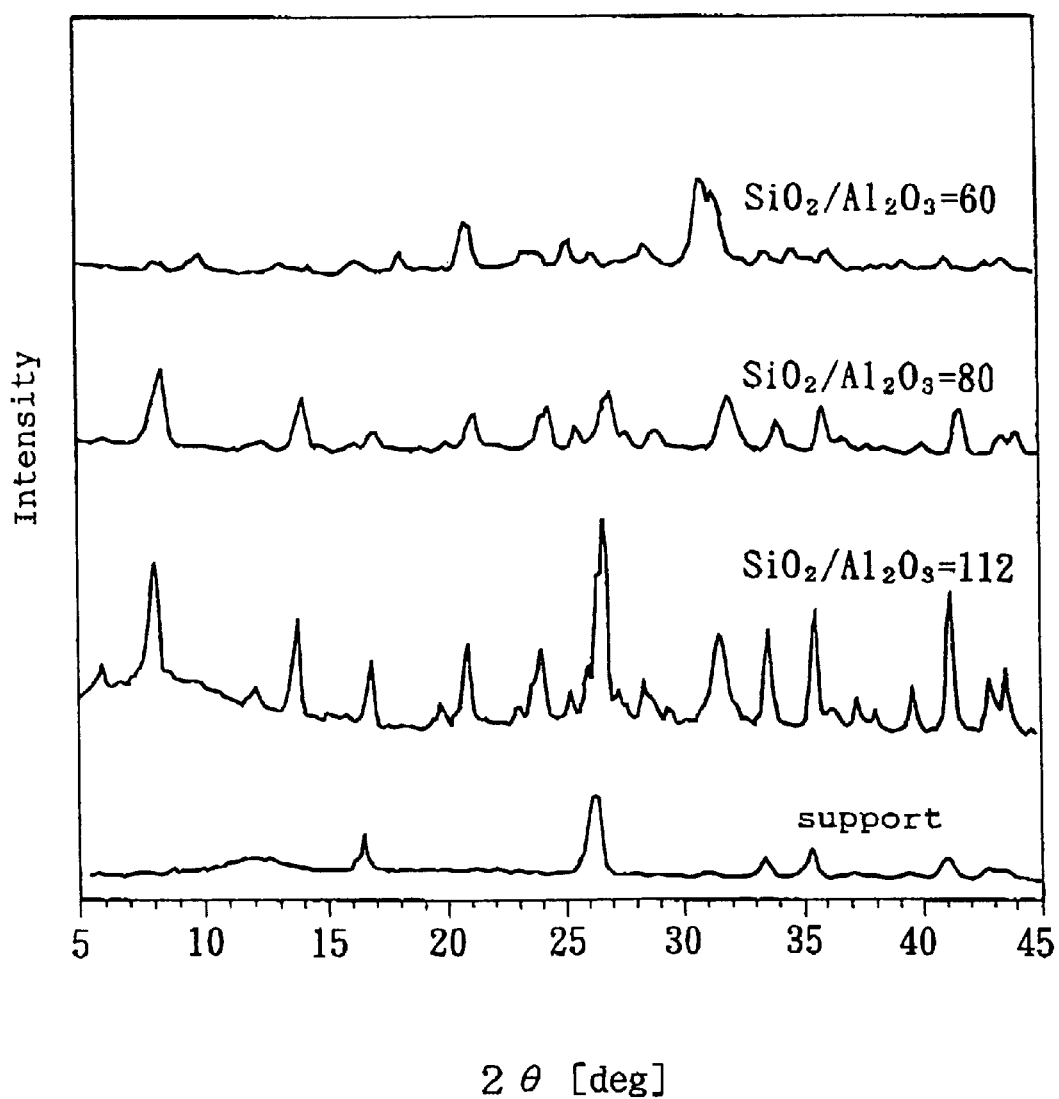
FIG. 2 is an X-ray diffraction diagram of the T-type zeolite membrane synthesized under different conditions.
Figure 3:
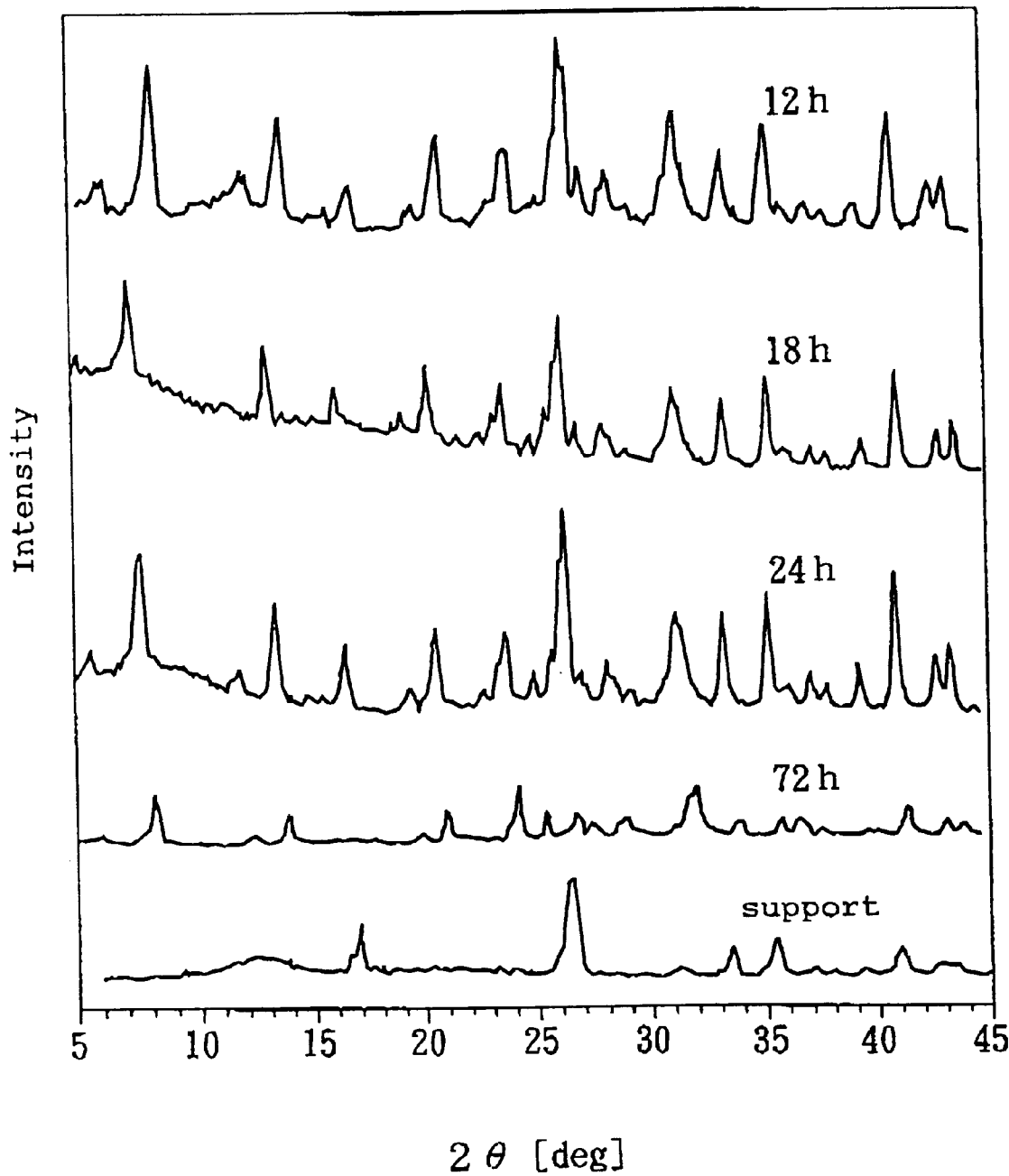
FIG. 3 is an X-ray diffraction diagram of the T-type zeolite membrane synthesized under different conditions.

FIG. 2 is an X-ray diffraction diagram showing the T-type zeolite membrane (manufacturing conditions: 100° C.×24 h)

synthesized with different gel composition (SiO$_2$/Al$_2$O$_3$=60 to 112)and; FIG. 3 is an X-ray diffraction diagram of the T-type zeolite membrane (manufacturing conditions: SiO$_2$/Al$_2$O$_3$=112, temperature 100° C.) synthesized for different synthesis times of 12 to 72 hours. Table 1 shows the PV separation performance of the T-type zeolite membrane corresponding to FIG. 3. In Table 1, Q is a total permeation flux density, QH$_2$O is a water permeation flux density, and a is a separation coefficient.

Figure 4:
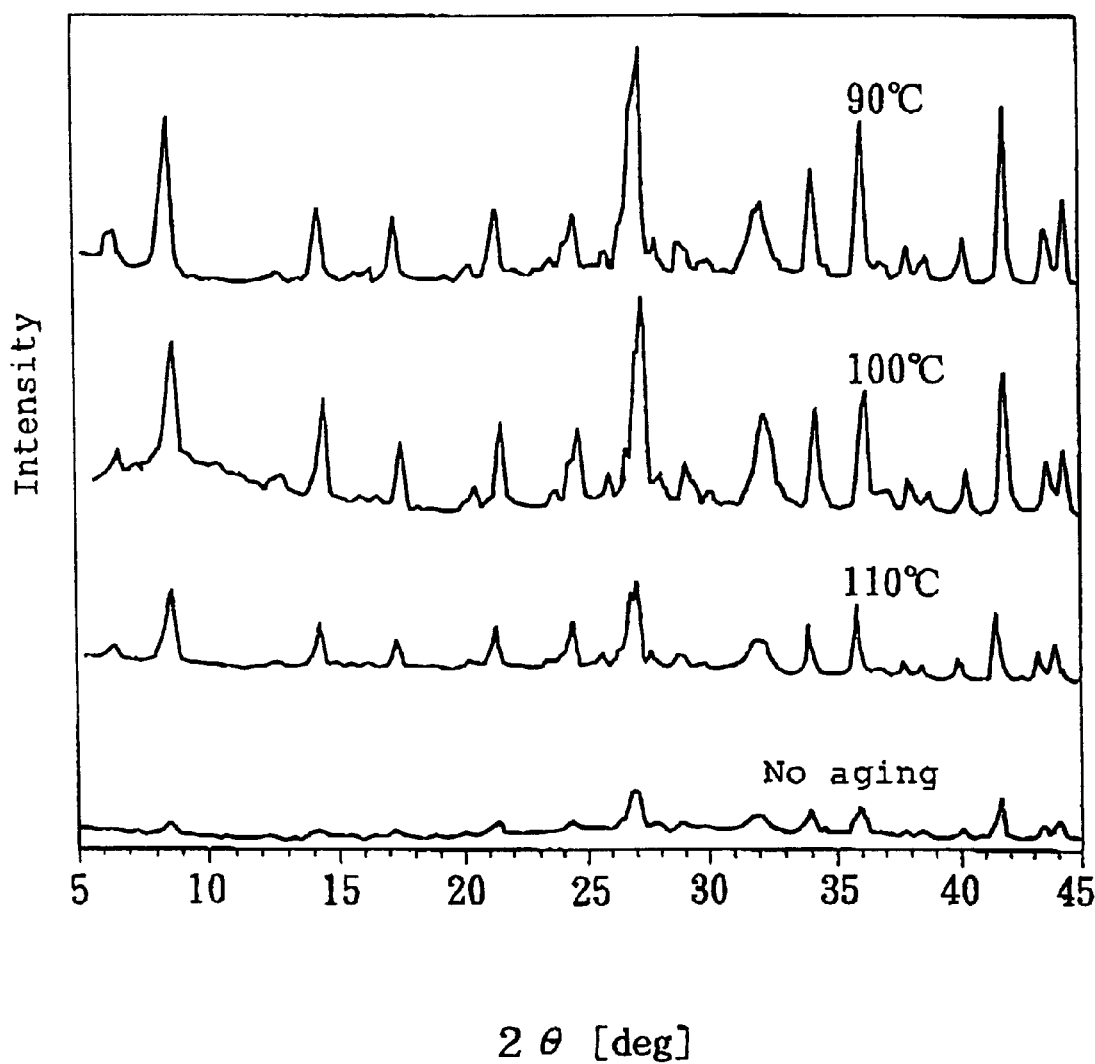
FIG. 4 is an X-ray diffraction diagram of the T-type zeolite membrane synthesized under different conditions.

FIG. 4 is an X-ray diffraction diagram of the T-type zeolite membrane (manufacturing conditions: SiO$_2$/A$_2$O$_3$=112, 24 hours) produced at different synthesis temperatures of 90 to 110° C. without subjecting it to aging. and Table 2 shows the PV separation performance (permeating liquid: water/ethanol mixture (10/90 wt %), 75° C.) of the T-type zeolite membrane corresponding to FIG. 4.

TABLE 1

| Synthesis time [h] | States of produced membranes | Permeation liquid conc. [H$_2$O wt %] | Q [kg/m$^2$h] | QH$_2$O [kg/m$^2$h] | OEtOH [kg/m$^2$h] | α [−] |
|---|---|---|---|---|---|---|
| 12 | homogeneous | 63.24 | 0.60 | 0.38 | 0.22 | 14 |
| 18 | homogeneous | 98.30 | 0.77 | 0.76 | 0.013 | 490 |
| 24 | homogeneous | 99.60 | 1.25 | 1.25 | 0.005 | 2200 |
| 72 | heterogeneous | 50.78 | 0.53 | 0.27 | 0.26 | 10 |

TABLE 2

| Synthesis temp. [° C.] | States of produced membranes | Permeation liquid conc. [H$_2$O wt %] | Q [kg/m$^2$h] | α [−] |
|---|---|---|---|---|
| 90 | homogeneous | 97.90 | 0.93 | 440 |
| 100 | homogeneous | 99.60 | 1.25 | 2200 |
| 110 | homogeneous | 96.04 | 0.33 | 210 |
| no aging | homogeneously glossy | | >10 | 1 |

As shown in the figures and tables above, it was found that the T-type zeolite membranes obtained according to the present invention exhibit excellent separation performance for a long period of time.

Example 2

The constituent ratio (ratio by weight) of colloidal silica, sodium aluminate, sodium hydroxide, potassium hydroxide and water was adjusted such that SiO$_2$/Al$_2$O$_3$=112, OH$^-$/SiO$_2$=0.77, Na$^+$/(Na$^+$+K$^+$)=0.77, and H$_2$O/(Na$^+$+K$^+$)=20.75, and the resulting mixture was stirred and then subjected to aging for 48 hours. A tubular porous alumina support previously subjected to the same species crystallization treatment as in Example 1 was immersed in the above aged liquid, followed by subjecting it to hydrothermal reaction at 100° C. for 24 hours. After synthesis, it was washed with distilled water and immersed for half a day in distilled water, then removed and dried in a oven at 70° C., and the T-type zeolite membrane was formed on the support.

Figure 5:
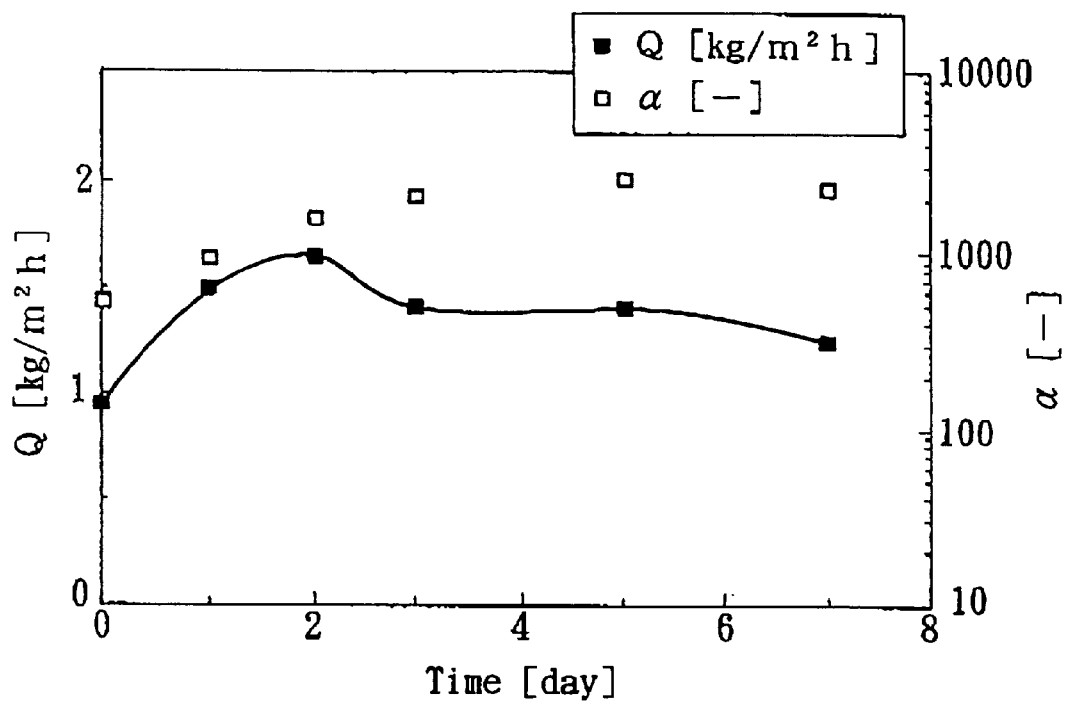
FIG. 5 shows a change with time of the separation performance of the T-type zeolite membrane immersed in aqueous acetic acid.
Figure 6:
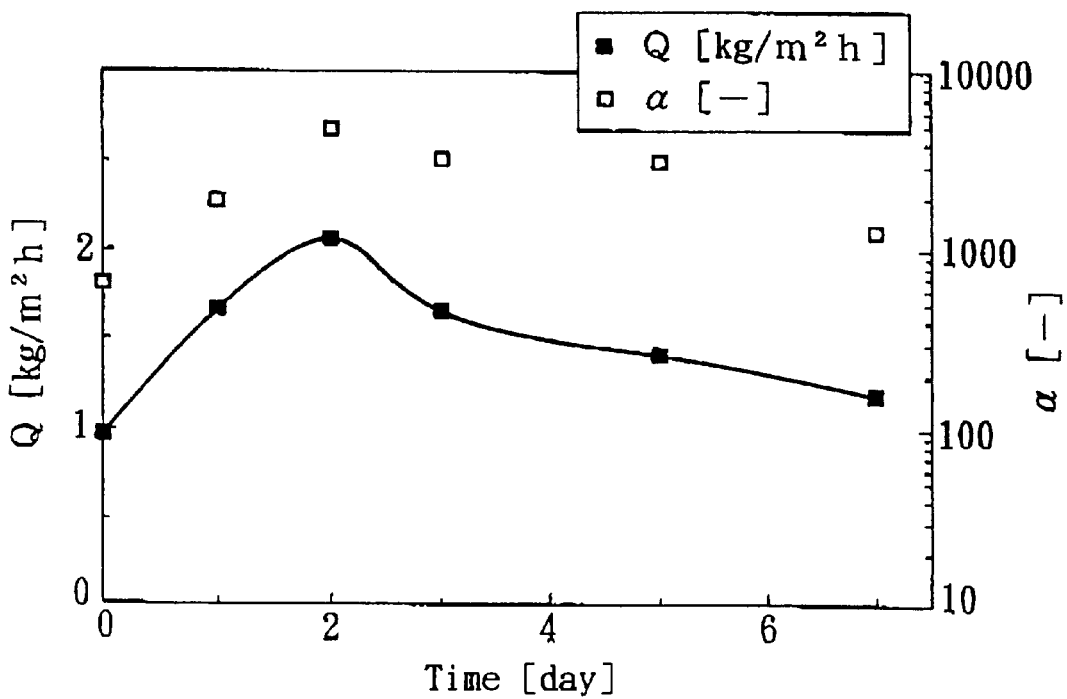
FIG. 6 shows a change with time of the separation performance of the T-type zeolite membrane immersed in aqueous acetic acid.

FIG. 5 and FIG. 6 show a change in the PV separation performance of the T-type zeolite membrane of the present invention (manufacturing conditions: SiO$_2$/Al$_2$O$_3$=112, 100° C.×24 hours; permeating liquid: water/ethanol mixture (10/90 wt %), 75° C.) immersed in aqueous acetic acid at pH 4, and pH 3, respectively. Table 3 shows the result of comparison of acid resistance between the T-type zeolite membrane of the present invention described above and the conventional A-type zeolite membrane.

From the figures and tables described above, it was found that the membrane performance of the T-type zeolite membranes of the present invention is not deteriorated even after immersion in aqueous acetic acid for a prolonged period of time, and the present membranes are extremely superior in acid resistance even to the A-type zeolite membrane.

TABLE 3

| | Acid treatment conditions for zeolite | | | PV performance before acid treatment | | PV performance after acid treatment | | |
|---|---|---|---|---|---|---|---|---|
| | Acid | Temp. [° C.] | Time [h] | Q [kg/m$^2$h] | α [−] | Q [kg/m$^2$h] | α [−] | States |
| A-type | Acetic acid | Room temp. | 100 | 1.62 | >10000 | | 1 | Membrane removal after acid treatment and drying |
| | | Room temp. | 24 | 1.81 | >10000 | | 1 | Membrane removal after acid treatment and drying |
| T-type | Aqueous acetic acid (ph 4) | Room temp. | 100 | 1.0 | 800 | 1.40 | 2000 | |
| | Aqueous acetic acid (ph 3) | Room temp. | 100 | 1.0 | 800 | 1.40 | 3000 | |
| | Aqueous acetic acid (ph 2) | Room temp. | 100 | 1.2 | 2000 | 0.8 | 700 | |

According to the present process for producing a membrane for separating a mixture, there can be provided a separation membrane on which chemical resistance such as acid resistance and alkali resistance as well as durability besides the molecular sieve ability of zeolite Itself have been conferred by forming the T-type zeolite membrane on a porous support by a specific manner.

What is claimed is:

1. A process for producing a membrane for separating a liquid and/or gas mixture consisting of:

depositing seed crystals of T-type zeolite on a porous support;

stirring an aqueous mixture containing a silica source, an alumina source, sodium ions, and potassium ions as starting materials and then aging the mixture for a predetermined time; and immersing the porous support carrying the seed crystals in the aged mixture and then subjecting it to hydrothermal reaction to deposit T-type zeolite on the porous support.

2. A process for producing a membrane for separating the mixture according to claim 1, wherein the molar ratio of the starting materials charged is regulated such that $SiO_2/Al_2O_3$=30 to 150, $OH^-/SiO_2$=0.1 to 1.0, $Na^+/(Na^++K^+)$=0.1 to 1.0, and $H_2O/(Na^++K^+)$=10 to 50.

3. A process for producing a membrane for separating the mixture according to claim 1, wherein the hydrothermal reaction is conducted at a temperature of 80 to 150° C. at normal pressure for 1 to 168 hours.

4. A process for producing a membrane for separating the mixture according to claim 1, wherein the molar ratio of erionite/offretite in the T-type zeolite is 0.5 to 0.95/0.5 to 0.05.

5. A process for producing a membrane for separating the mixture according to claim 2, wherein the hydrothermal reaction is conducted at a temperature of 80 to 150° C. at normal pressure for 1 to 168 hours.

6. A process for producing a membrane for separating the mixture according to claim 2, wherein the molar ratio of erionite/offretite in the T-type zeolite is 0.5 to 0.95/0.5 to 0.05.

7. A process for producing a membrane for separating the mixture according to claim 3, wherein the molar ratio of erionite/offretite in the T-type zeolite is 0.5 to 0.95/0.5 to 0.05.

8. A process for producing a membrane for separating the mixture according to claim 1, wherein the aging is conducted for about 28 to about 48 hours.

9. A process for producing a membrane for separating the mixture according to claim 1, wherein the aging is conducted at a temperature lower than about 70° C.

10. A process for producing a membrane for separating the mixture according to claim 1, wherein the aging is conducted at about room temperature.

* * * * *